United States Patent [19]
Kinugasa et al.

[11] Patent Number: 5,782,087
[45] Date of Patent: Jul. 21, 1998

[54] DEVICE FOR PURIFYING EXHAUST GAS OF AN ENGINE

[75] Inventors: Yukio Kinugasa; Kouhei Igarashi, both of Susono; Takaaki Itou, Mishima; Naoto Suzuki, Susono; Takehisa Yaegashi, Mishima; Toshiaki Tanaka, Numazu, all of Japan

[73] Assignee: Toyota Jidosha Kabushiki Kaisha, Aichi, Japan

[21] Appl. No.: 746,056

[22] Filed: Nov. 6, 1996

[30] Foreign Application Priority Data

Nov. 10, 1995 [JP] Japan ................. 7-292906

[51] Int. Cl.$^6$ ................................. F01N 3/20
[52] U.S. Cl. ................ 60/276; 60/285; 60/297
[58] Field of Search ............. 60/274, 276, 285, 60/289, 297

[56] References Cited

U.S. PATENT DOCUMENTS

| | | | |
|---|---|---|---|
| 3,767,764 | 10/1973 | Dolbear | 423/213.2 |
| 5,041,270 | 8/1991 | Fujitani et al. | 423/213.2 |
| 5,461,857 | 10/1995 | Itou et al. | 60/276 |
| 5,471,836 | 12/1995 | Takeshima et al. | 60/286 X |
| 5,473,887 | 12/1995 | Takeshima et al. | 60/276 |
| 5,499,501 | 3/1996 | Kato et al. | 60/297 X |
| 5,551,231 | 9/1996 | Tanaka et al. | 60/289 |

FOREIGN PATENT DOCUMENTS

| | | |
|---|---|---|
| A-0701858 | 3/1995 | European Pat. Off. |
| 1-130735 | 5/1989 | Japan |
| 1-310742 | 12/1989 | Japan |
| 4-365920 | 12/1992 | Japan |
| 5-131118 | 5/1993 | Japan |
| 6-108827 | 4/1994 | Japan |
| 6-330741 | 12/1994 | Japan |

OTHER PUBLICATIONS

Patent Abstracts of Japan, vol. 008, No. 020 (M–271), Jan. 24, 1984, Abstracts of JP–58–178848 A (Nippon Denso KK), Oct. 19, 1983.

*Primary Examiner*—Tony M. Argenbright
*Attorney, Agent, or Firm*—Kenyon & Kenyon

[57] ABSTRACT

An exhaust manifold of an engine is connected to a three way (TW) catalyst, and the TW catalyst is connected to an $NH_3$ adsorbing and oxidizing ($NH_3$-AO) catalyst, such as the Cu-zeolite catalyst. The engine performs the lean and the rich operations alternately and repeatedly. When the engine performs the rich operation, the TW catalyst synthesizes $NH_3$ from $NO_x$ in the inflowing exhaust gas, and the $NH_3$ is then adsorbed in the $NH_3$-AO catalyst. Next, when the engine performs the lean operation, $NO_x$ passes through the TW catalyst, and the adsorbed $NH_3$ is desorbed and reduces the inflowing $NO_x$. When the rich operation is in process, or is to be started, the exhaust gas temperature flowing into the $NH_3$-AO catalyst is detected. If the temperature is equal to or higher than the upper threshold representing the rich endurance temperature, the lean or the stoichiometric operation is performed.

13 Claims, 11 Drawing Sheets

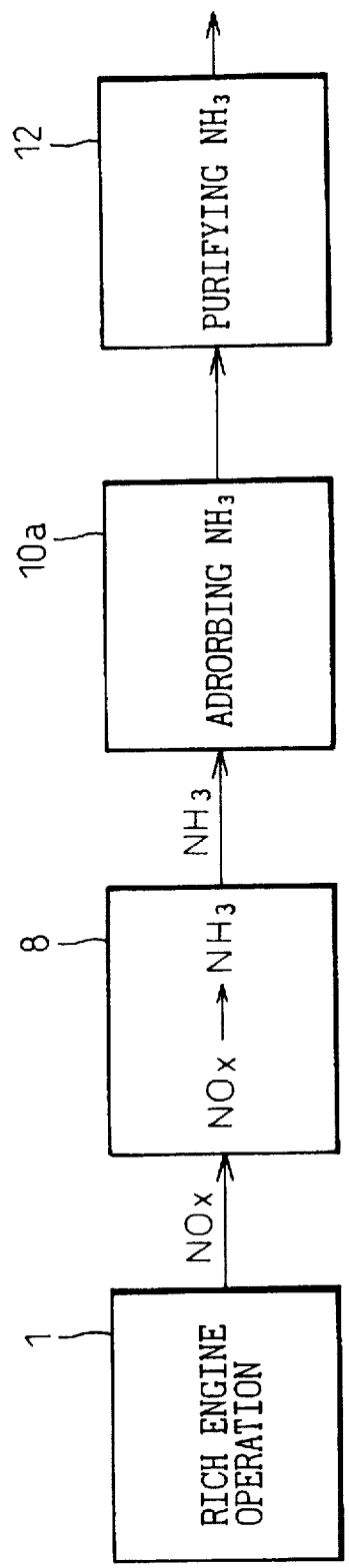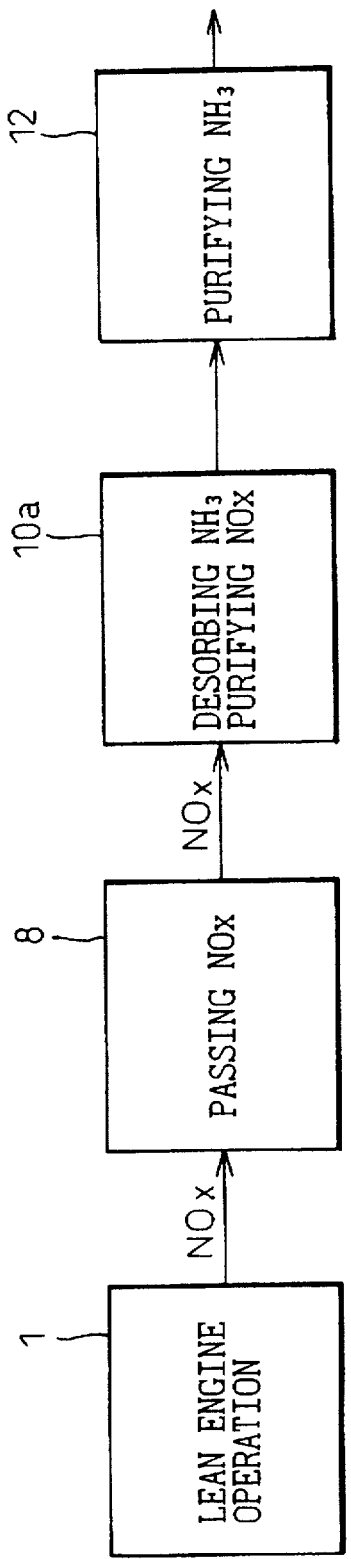

DEVICE FOR PURIFYING EXHAUST GAS OF AN ENGINE

BACKGROUND OF THE INVENTION

1. Field of the Invention

The present invention relates to a device for purifying exhaust gas of an engine.

2. Description of the Related Art

The air-fuel ratio of an air-fuel mixture in a combustion chamber of an internal combustion engine can be referred as an engine air-fuel ratio. Japanese unexamined patent publication No. 4-365920 discloses an exhaust gas purifying device for an internal combustion engine with multi-cylinders, the engine having a first and a second cylinder groups, in which the device is provided with: an engine operation control device to continuously make each cylinder of the first cylinder group a rich engine operation in which the engine air-fuel ratio is rich, and to continuously make each cylinder of the second cylinder group a lean engine operation in which the engine air-fuel ratio is lean; a first exhaust passage connected to each cylinder of the first cylinder group; a second exhaust passage connected to each cylinder of the second cylinder group and different from the first exhaust passage; an $NH_3$ synthesizing catalyst arranged in the first exhaust passage for synthesizing ammonia $NH_3$ from at least a part of $NO_x$ in the inflowing exhaust-gas; an interconnecting passage interconnecting the first exhaust passage downstream of the $NH_3$ synthesizing catalyst and the second exhaust passage to each other; and an exhaust gas purifying catalyst arranged in the interconnecting passage to react $NO_x$ and $NH_3$ flowing therein to each other to thereby purify $NO_x$ and $NH_3$ simultaneously. In this exhaust gas purifying device, for example, a three way catalyst is used as the $NH_3$ synthesizing catalyst, and a so-called zeolite catalyst, which is comprised of a zeolite carrying cobalt Co, copper Cu, nickel Ni, iron Fe, or the like, is used as the exhaust gas purifying catalyst. If a ratio of the total amount of air fed into the intake passage, the combustion chamber, and the exhaust passage upstream of a certain position in the exhaust passage to the total amount of fuel fed into the intake passage, the combustion chamber, and the exhaust passage upstream of the above-mentioned position is referred to as an exhaust gas air-fuel ratio of the exhaust gas flowing through the certain position, such a zeolite catalyst has a lean endurance temperature, which is an endurance temperature when the exhaust gas air-fuel ratio of the inflowing exhaust gas is lean, and a rich endurance temperature, which is an endurance temperature when the exhaust gas air-fuel ratio of the inflowing exhaust gas is rich, and the lean endurance temperature is generally higher than the rich endurance temperature. Note that if the temperature of the zeolite catalyst is higher than an endurance temperature thereof, the catalyst will remarkably deteriorate.

On the other hand, the larger number of the cylinders of the second cylinder group which performs the lean engine operation is preferable for decreasing the fuel consumption rate. In this case, the exhaust gas air-fuel ratio of the majority of the exhaust gas flowing into the zeolite catalyst is lean. Thus, it may be considered that, if the temperature of the zeolite catalyst is controlled to be lower than the lean endurance temperature by, for example, controlling the temperature of the inflowing exhaust gas, the durability of the zeolite catalyst is ensured, to thereby ensure good purification of the exhaust gas. However, in this case, even though the temperature of the zeolite catalyst is made lower than the lean endurance temperature thereof, the temperature of the zeolite catalyst may be higher than the rich endurance temperature. However, microscopically, the exhaust gas of which the exhaust gas air-fuel ratio is lean and the exhaust gas of which the exhaust gas air-fuel ratio is rich flow into the zeolite catalyst alternately and repeatedly. Accordingly, if the temperature of the zeolite catalyst is higher than the rich endurance temperature thereof when the exhaust gas air-fuel ratio of the inflowing exhaust gas is rich, the zeolite catalyst may deteriorate remarkably, and thus good purification of the exhaust gas cannot be ensured.

SUMMARY OF THE INVENTION

An object of the present invention is to provide a device for purifying an exhaust gas of an engine which can ensure the durability of the catalyst.

According to the present invention, there is provided a device for purifying an exhaust gas of an engine having an exhaust passage, comprising: an exhaust gas purifying catalyst arranged in the exhaust passage, of which an endurance temperature, when an exhaust gas air-fuel ratio of the inflowing exhaust gas is lean or stoichiometric, is higher than a rich endurance temperature which is an endurance temperature when an exhaust gas air-fuel ratio of the inflowing exhaust gas is rich; exhaust gas air-fuel ratio control means for controlling the exhaust gas air-fuel ratio of the exhaust gas flowing into the exhaust gas purifying catalyst; making-rich means adapted for controlling the exhaust gas air-fuel ratio control means to make the exhaust gas air-fuel ratio of the exhaust gas flowing into the exhaust gas purifying catalyst rich; and avoiding-rich means for controlling the exhaust gas air-fuel ratio control means to make the exhaust gas air-fuel ratio of the exhaust gas flowing into the exhaust gas purifying catalyst lean or stoichiometric when the making-rich operation of the making-rich means is to be performed and when a temperature representing a temperature of the exhaust gas purifying catalyst is equal to or higher than the rich endurance temperature.

The present invention may be more fully understood from the description of preferred embodiments of the invention set forth below, together with the accompanying drawings.

BRIEF DESCRIPTION OF THE DRAWINGS

In the drawings:

FIGS. 4A and 4B schematically illustrate the exhaust gas purifying method in the engine shown in FIG. 1;

DESCRIPTION OF THE PREFERRED EMBODIMENTS

In general, nitrogen oxides ($NO_x$) include nitrogen monoxide NO, nitrogen dioxide $NO_2$, dinitrogen tetroxide $N_2O_4$, dinitrogen monoxide $N_2O$, etc. The following explanation is made referring $NO_x$ mainly as nitrogen monoxide NO and/or nitrogen dioxide $NO_2$, but a device for purifying an exhaust gas of an engine according to the present invention can purify the other nitrogen oxides.

Figure 1:
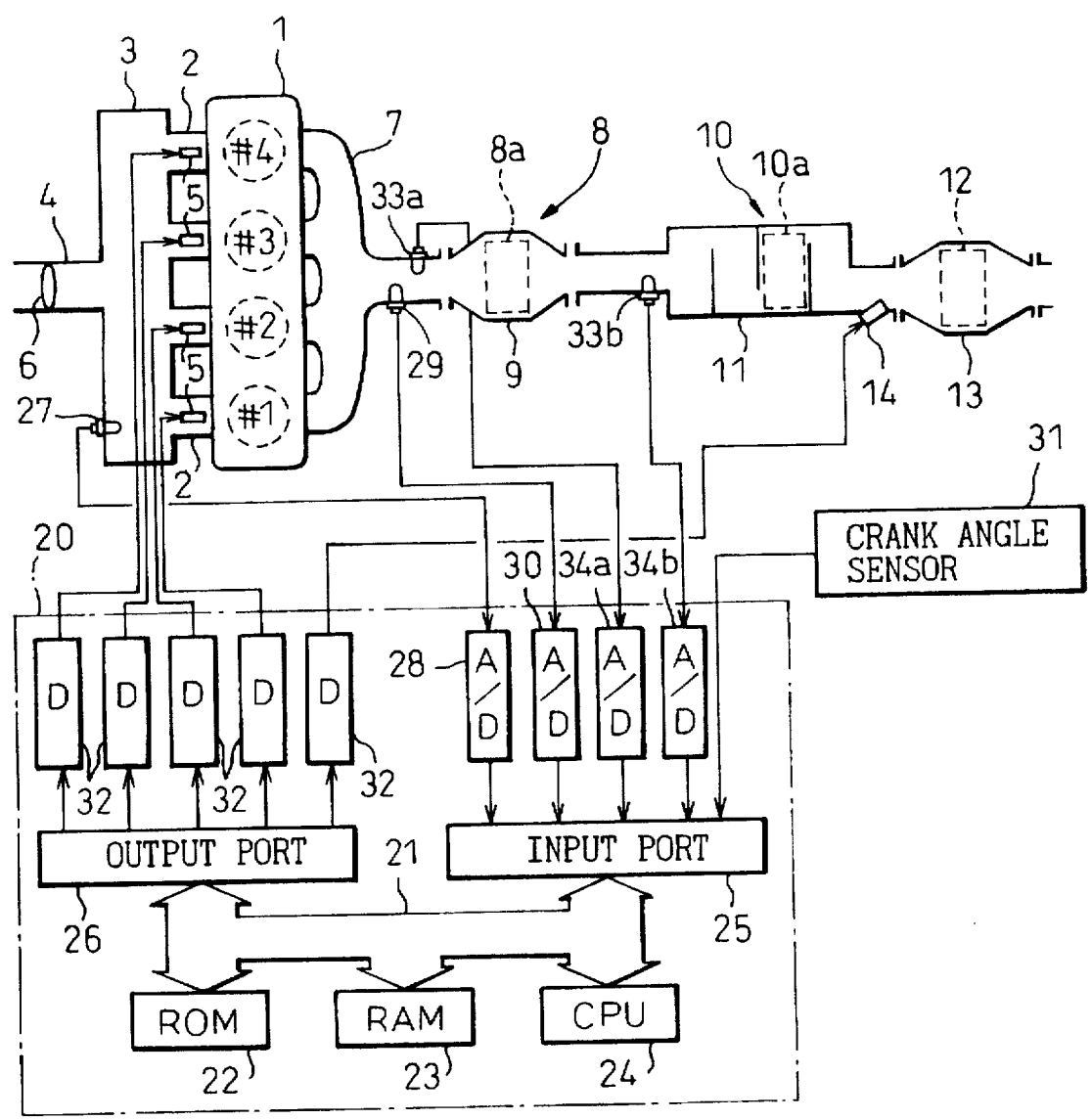
FIG. 1 is a general view of an internal combustion engine.

FIG. 1 shows the case where the present invention is applied to an internal engine of the spark ignition type. However, the present invention may be applied to a diesel engine. Also, the engine shown in FIG. 1 can be used for an automobile, for example.

Referring to FIG. 1, an engine body 1, which is a spark-ignition type engine, has four cylinders, i.e., a first cylinder #1, a second cylinder #2, a third cylinder #3, a fourth cylinder #4. Each cylinder #1 to #4 is connected to a common surge tank 3, via a corresponding branch 2, and the surge tank 3 is connected to a air-cleaner (not shown) via an intake duct 4. In each branch 2, a fuel injector 5 is arranged to feed fuel, such as gasoline, to the corresponding cylinder. Further, a throttle valve 6 is arranged in the intake duct 4, an opening of which becomes larger as the depression of the acceleration pedal (not shown) becomes larger. Note that the fuel injectors 5 are controlled in accordance with the output signals from an electronic control unit 20.

On the other hand, each cylinder is connected to a common exhaust manifold 7, and the exhaust manifold 7 is connected to a catalytic converter 9 housing an $NH_3$ synthesizing catalyst 8 therein. The catalytic converter 9 is then connected to a muffler 11 housing an exhaust gas purifying catalyst 10 therein. The muffler 11 is then connected to a catalytic converter 13 housing an $NH_3$ purifying catalyst 12 therein. Further, as shown in FIG. 1, a secondary air supplying device 14 is arranged in the exhaust passage between the muffler 11 and the catalytic converter 13, for supplying a secondary air to the $NH_3$ purifying catalyst 12, and is controlled in accordance with the output signals from the electronic control unit 20.

The electronic control unit 20 comprises a digital computer and is provided with a ROM (read only memory) 22, a RAM (random access memory) 23, a CPU (micro processor) 24, an input port 25, and an output port 26, which are interconnected by a bidirectional bus 21. Mounted in the surge tank 3 is a pressure sensor 27 generating an output voltage proportional to the pressure in the surge tank 3. The output voltage of the sensor 27 is input via an AD converter 28 to the input port 25. The intake air amount Q is calculated in the CPU 24 on the basis of the output signals from the AD converter 28. Further, mounted in the collecting portion of the exhaust manifold 7 is an air-fuel ratio sensor 29 generating an output voltage proportional to the exhaust gas air-fuel ratio of the exhaust gas flowing through the collecting portion of the exhaust manifold 7. The output voltage of the sensor 29 is input via an AD converter 30 to the input port 25. Mounted in the exhaust passage around inlets of the catalytic converter 8 and the muffler 11 are temperature sensors 33a and 33b, each generating an output voltage proportional to the temperature of the exhaust gas passing therethrough. The output voltages of the sensors 33a and 34b is input via corresponding AD converters 34a and 34b to the input port 25. Further, connected to the input port 25 is a crank angle sensor 31 generating an output pulse whenever the crank shaft of the engine 1 turns by, for example, 30 degrees. The CPU 24 calculates the engine speed N in accordance with the pulse. On the other hand, the output port 26 is connected to the fuel injectors 5, and the secondary supplying device 14, via corresponding drive circuits 32.

In the embodiment shown in FIG. 1, the $NH_3$ synthesizing catalyst 8 is comprised of a three-way catalyst 8a, which is simply expressed as a TW catalyst, here. The TW catalyst 8a is comprised of precious metals such as palladium Pd, platinum Pt, and rhodium Rh, carried on a layer of, for example, alumina, formed on a surface of a base.

Figure 2:
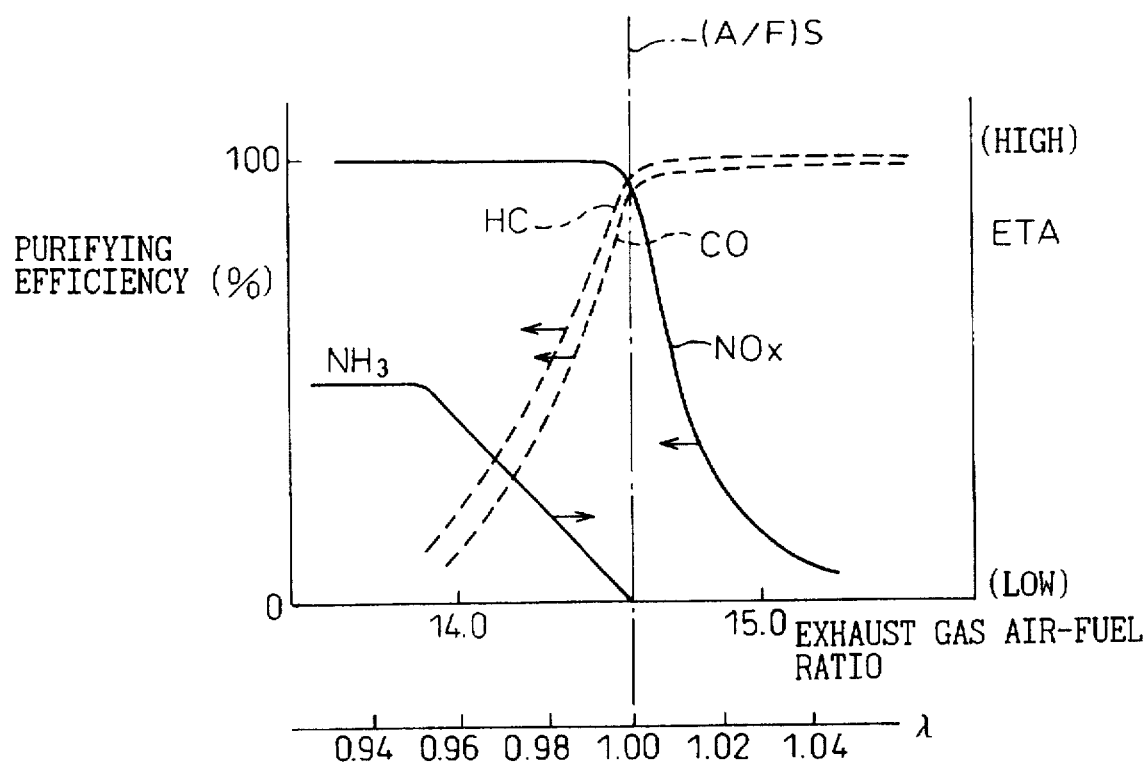
FIG. 2 illustrates a characteristic of a three-way catalyst.

FIG. 2 illustrates the purifying efficiency of the exhaust gas of the TW catalyst 8a. FIG. 2A shows that the TW catalyst 8a passes the inflowing $NO_x$ therethrough when the exhaust gas air-fuel ratio of the inflowing exhaust gas is lean with respect to the stoichiometric air-fuel ratio (A/F)S, which is about 14.6 and the air-excess ratio λ=1.0, and the TW catalyst 8a synthesizes $NH_3$ from a part of the inflowing $NO_x$ when the exhaust gas air-fuel ratio of the inflowing exhaust gas is rich. The $NH_3$ synthesizing function of the TW catalyst 8a is partly unclear, but it can be considered that some of $NO_x$ in the exhaust gas of which the exhaust gas air-fuel ratio is rich is converted to $NH_3$ according to the following reactions (1) and (2), that is:

$$5H_2 + 2NO \rightarrow 2NH_3 + 2H_2O \qquad (1)$$

$$7H_2 + 2NO_2 \rightarrow 2NH_3 + 4H_2O \qquad (2)$$

On the contrary, it is considered that the other $NO_x$ is reduced to the nitrogen $N_2$ according to the following reactions (3) to (6), that is:

$$2CO + 2NO \rightarrow N_2 + 2CO_2 \qquad (3)$$

$$2H_2 + 2NO \rightarrow N_2 + 2H_2O \qquad (4)$$

$$4CO + 2NO_2 \rightarrow N_2 + 4CO_2 \qquad (5)$$

$$4H_2 + 2NO_2 \rightarrow N_2 + 4H_2O \qquad (6)$$

Accordingly, $NO_x$ flowing in the TW catalyst 8a is converted to either $NH_3$ or $N_2$ when the exhaust gas air-fuel ratio of the inflowing exhaust gas is rich, and thus $NO_x$ is prevented from being discharged from the TW catalyst 8a.

As shown in FIG. 2, an efficiency ETA of the $NH_3$ synthesizing of the TW catalyst 8a becomes larger as the exhaust gas air-fuel ratio of the inflowing exhaust gas becomes smaller or richer from the stoichiometric air-fuel ratio (A/F)S, and is kept constant when the exhaust gas air-fuel ratio of the inflowing exhaust gas becomes even smaller. In the example shown in FIG. 2, the $NH_3$ synthesizing efficiency ETA is kept constant when the exhaust gas air-fuel ratio of the inflowing exhaust gas equals or is smaller than about 13.8, where the air-excess ratio λ is about 0.95. Note that, in the engine shown in FIG. 1, it is desired to synthesize as much $NH_3$ as possible, when the exhaust gas air-fuel ratio of the exhaust gas flowing the TW catalyst 8a is rich, because of the reasons described below. Accordingly, a TW catalyst carrying palladium Pd or cerium Ce is used as the TW catalyst 8a. In particular, a TW catalyst carrying palladium Pd can also enhance an HC purifying efficiency, when the exhaust air-fuel ratio of the inflowing exhaust gas is rich. Further, note that a TW catalyst carrying rhodium Rh suppresses $NH_3$ synthesizing therein, and a TW catalyst without rhodium Rh must be used as the TW catalyst 8a.

On the other hand, in the embodiment shown in FIG. 1, the exhaust gas purifying catalyst 10 consists of an $NH_3$ adsorbing and oxidizing catalyst 10a, which is simply expressed as a $NH_3$-AO catalyst. The $NH_3$-AO catalyst 10a is comprised of a so-called zeolite denitration catalyst, such as zeolite carrying copper Cu thereon, which is expressed as the Cu-zeolite catalyst, zeolite carrying copper Cu and platinum Pt thereon, and zeolite carrying iron Fe thereon, which is carried on a surface of a base. Alternatively, the $NH_3$-AO catalyst 10a is comprised of a solid acid such as zeolite, silica, silica-alumina, and titania, carrying the transition metals such as iron Fe and copper Cu or precious metals such as palladium Pd, platinum Pt and rhodium Rh.

The NH$_3$-AO catalyst 10a adsorbs NH$_3$ in the inflowing exhaust gas, and desorbs the adsorbed NH$_3$ when the NH$_3$ concentration in the inflowing exhaust gas becomes lower, or when the inflowing exhaust gas includes NO$_x$. At this time, if the NH$_3$-AO catalyst 10a is in an oxidizing atmosphere, that is, if the exhaust gas air-fuel ratio of the inflowing exhaust gas is lean, the NH$_3$-AO catalyst 10a oxidizes all of NH$_3$ desorbed therefrom. Also, if the inflowing exhaust gas includes both NH$_3$ and NO$_x$, the NH$_3$-AO catalyst 10a oxidizes NH$_3$ by NO$_x$. In these cases, the NH$_3$ oxidizing function is not completely clear, but it can be considered that the NH$_3$ oxidation occurs according to the following reactions (7) to (10), that is:

$$4NH_3 + 7O_2 \rightarrow 4NO_2 + 6H_2O \quad (7)$$

$$4NH_3 + 5O_2 \rightarrow 4NO + 6H_2O \quad (8)$$

$$8NH_3 + 6NO_2 \rightarrow 12H_2O + 7N_2 \quad (9)$$

$$4NH_3 + 4NO + O_2 \rightarrow 6H_2O + 4N_2 \quad (10)$$

The reactions (9) and (10), which are denitration, reduce both NO$_x$ produced in the oxidation reactions (7) and (8), and NO$_x$ in the exhaust gas flowing in the NH$_3$-AO catalyst 10a.

It has been found, by experiment, that the NH$_3$-AO catalyst 10a of the Cu-zeolite catalyst performs good oxidation and denitration when the temperature of the inflowing exhaust gas is about 280° to 500° C. On the other hand, it has been found that if the catalyst is arranged in the muffler 11, the temperature of the exhaust gas passing through the muffler 11 is about 280° to 500° C. Therefore, in this embodiment, the NH$_3$-AO catalyst 10a is arranged in the muffler 11 to thereby ensure good performance of the NH$_3$-AO catalyst 10a.

The NH$_3$ purifying catalyst 12 muffler 11 is comprised of transition metals such as iron Fe and copper Cu, or precious metals such as palladium Pd, platinum Pt, and rhodium Rh, carried on a layer of, for example, alumina, formed on a surface of a base. The NH$_3$ purifying catalyst 12 purifies NH$_3$ in the inflowing exhaust gas, if the catalyst 12 is in an oxidizing atmosphere, that is, if the exhaust gas air-fuel ratio of the inflowing exhaust gas is lean. In this case, it is considered that the oxidation and denitration reactions (7) to (10) mentioned above occur in the catalyst 12 and thereby NH$_3$ is purified. In this embodiment, basically, the NH$_3$ amount exhausted from the NH$_3$-AO catalyst 10a is kept zero, but the NH$_3$ purifying catalyst 12 prevents NH$_3$ from being discharged to the outside air, even if NH$_3$ is discharged from the NH$_3$-AO catalyst 10a without being purified.

In the engine shown in FIG. 1, the fuel injection time TAU is calculated using the following equation:

$$TAU = TB \cdot ((A/F)S/(A/F)T) \cdot FAF$$

TB represents a basic fuel injection time suitable for making the engine air-fuel ratio of each cylinder equal to the stoichiometric air-fuel ratio (A/F)S, and is calculated using the following equation:

$$TB = (Q/N) \cdot K$$

where Q represents the intake air amount, N represents the engine speed, and K represents a constant. Accordingly, the basic fuel injection time TB is the product of an intake air amount per unit engine speed and the constant.

(A/F)T represents a target value for the control of the engine air-fuel ratio. When the target value (A/F)T is made larger to make the engine air-fuel ratio lean with respect to the stoichiometric air-fuel ratio, the fuel injection time TAU is made shorter and thereby the fuel amount to be injected is decreased. When the target value (A/F)T is made smaller to make the engine air-fuel ratio rich with respect to the stoichiometric air-fuel ratio, the fuel injection time TAU is made longer and thereby the fuel amount to be injected is increased.

FAF represents a feedback correction coefficient for making the actual engine air-fuel ratio equal to the target value (A/F)T. The feedback correction coefficient FAF is determined on the basis of the output signals from the air-fuel ratio sensor 29. The exhaust gas air-fuel ratio of the exhaust gas flowing through the exhaust manifold 7 and detected by the sensor 29 conforms to the engine air-fuel ratio. When the exhaust gas air-fuel ratio detected by the sensor 29 is lean with respect to the target value (A/F)T, the feedback correction coefficient FAF is made larger and thereby the fuel amount to be injected is increased. When the exhaust gas air-fuel ratio detected by the sensor 29 is rich with respect to the target value (A/F)T, FAF is made smaller and thereby the fuel amount to be injected is decreased. In this way, the actual engine air-fuel ratio is made equal to the target value (A/F)T. Note that the feedback correction coefficient FAF fluctuates around 1.0.

For detecting the exhaust gas air-fuel ratio more precisely, an additional air-fuel ratio sensor may be arranged in the exhaust passage between the TW catalyst 8a and the NH$_3$-AO catalyst 10a, or in the exhaust passage between the NH$_3$-AO catalyst 10a and the NH$_3$ purifying catalyst 12, to compensate for the deviation of the engine air-fuel ratio from the target value (A/F)T due to the deterioration of the sensor 29. For the sensor 29 and the additional sensor, an air-fuel ratio sensor generating an output voltage which corresponds to the exhaust gas air-fuel ratio over the broader range of the exhaust gas air-fuel ratio may be used, while a Z-output type oxygen concentration sensor, of which an output voltage varies drastically when the detecting exhaust gas air-fuel ratio increases or decreases across the stoichiometric air-fuel ratio, may also be used. Additionally, the deterioration of the catalyst(s) located between the sensors may be detected on the basis of the output signals from the sensors.

In the engine shown in FIG. 1, there is no device for supplying secondary fuel or secondary air in the exhaust passage, other than the secondary air supplying device 14. Thus, the engine air-fuel ratio in the exhaust passage upstream of the secondary air supplying device 14 conforms to the engine air-fuel ratio. In other words, the exhaust gas air-fuel ratio of the exhaust gas flowing in the TW catalyst 8a conforms to the engine air-fuel ratio, and the exhaust gas air-fuel ratio of the exhaust gas flowing in the exhaust gas purifying catalyst 10 also conforms to the engine air-fuel ratio. Contrarily, in the exhaust passage downstream of the secondary air supplying device 14, the exhaust gas air-fuel ratio conforms to the engine air-fuel ratio when the supply of the secondary air is stopped, and is made lean with respect to the engine air-fuel ratio when the secondary air is supplied.

Figure 3:
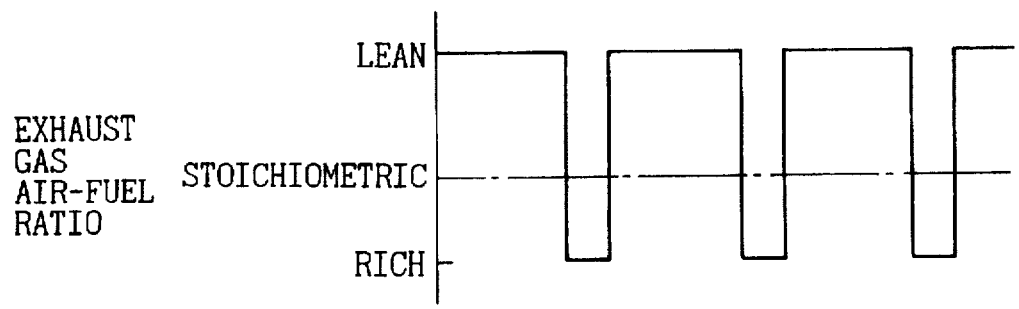
FIG. 3 schematically illustrates a method for purifying the exhaust gas according to the present invention.

Next, the basic method for purifying the exhaust gas in the engine shown in FIG. 1 will be explained with reference to FIGS. 3, 4A, and 4B.

In the engine shown in FIG. 1, an exhaust gas portion of which the exhaust gas air-fuel ratio is lean, and an exhaust gas portion of which the exhaust gas air-fuel ratio is rich, are formed from the exhaust gas of the engine 1, alternately and repeatedly. Then, the exhaust gas portions are introduced to, in turn, the TW catalyst 8a, the exhaust gas purifying catalyst 10, and the $NH_3$ purifying catalyst 12. In other words, the exhaust gas air-fuel ratio of the exhaust gas flowing in the catalysts 8a and 10a is made lean and rich alternately and repeatedly, as shown in FIG. 3. When the exhaust gas air-fuel ratio of the inflowing exhaust gas is made rich, the TW catalyst 8a converts $NO_x$ in the inflowing exhaust gas to $NH_3$ or $N_2$, as shown in FIG. 4A, according to the above-mentioned reactions (1) and (2). The $NH_3$ synthesized in the TW catalyst 8a then flows into the $NH_3$-AO catalyst 10a. At this time, the concentration of $NH_3$ in the inflowing exhaust gas is relatively high, and thus almost all of the $NH_3$ in the inflowing exhaust gas is adsorbed in the $NH_3$-AO catalyst 10a. Even though $NH_3$ flows out the $NH_3$-AO catalyst 10a without being adsorbed, the $NH_3$ then flows into the $NH_3$ purifying catalyst 12 and is purified or oxidized, because the catalyst 12 is kept under the oxidizing atmosphere by the secondary air supplying device 14. In this way, $NH_3$ is prevented from being discharged to the outside air.

Contrarily, when the exhaust gas air-fuel ratio of the inflowing exhaust gas is made lean, the TW catalyst 8a passes the inflowing $NO_x$ therethrough, as shown in FIG. 4B, and the $NO_x$ then flows into the $NH_3$-AO catalyst 10a. At this time, the $NH_3$ concentration in the inflowing exhaust gas is substantially zero, and thus $NH_3$ is desorbed from the $NH_3$-AO catalyst 10a. At this time, the $NH_3$-AO catalyst 10a is under the oxidizing atmosphere, and thus the desorbed $NH_3$ acts as a reducing agent, and reduces and purifies $NO_x$ in the inflowing exhaust gas, according to the above-mentioned reactions (7) to (10). Note that, even if the $NH_3$ amount desorbed from the $NH_3$-AO catalyst 10a exceeds the amount required for reducing the inflowing $NO_x$, the excess $NH_3$ is purified in the $NH_3$-AO catalyst 10a or the $NH_3$ purifying catalyst 12. Accordingly, $NH_3$ is prevented from being discharged to the outside air. Note that, in this case, the secondary air is unnecessary.

When the exhaust gas air-fuel ratio of the inflowing exhaust gas is rich, hydrocarbon HC, carbon monoxide CO, or hydrogen $H_2$ may pass through the TW catalyst 8a and may flow into the $NH_3$-AO catalyst 10a. It is considered that the HC, CO, etc. act as the reducing agent, as well as $NH_3$, and reduce a part of $NO_x$ on the $NH_3$-AO catalyst 10a. However, the reducing ability of $NH_3$ is higher than those of HC, CO, etc., and thus $NO_x$ can be reliably purified by using $NH_3$ as the reducing agent.

In this way, $NO_x$ exhausted from the engine is reduced to $N_2$ or adsorbed in the $NH_3$-AO catalyst 10a in the form of $NH_3$ when the exhaust gas air-fuel ratio of the exhaust gas flowing into the catalysts 8a and 10a is rich, and is reduced to $N_2$ by $NH_3$ desorbed from the $NH_3$-AO catalyst 10a when the exhaust gas air-fuel ratio of the exhaust gas flowing into the catalysts 8a and 10a is lean. Accordingly, $NO_x$ is prevented from being discharged to the outside air, regardless whether the exhaust gas air-fuel ratio of the exhaust gas flowing into the catalysts 8a and 10a is rich or lean.

Note that, as mentioned above, it is desired that the $NH_3$ purifying catalyst 12 is kept under the oxidizing atmosphere to ensure good $NH_3$ purification. In this embodiment, the secondary air supplying device 14 supplies the secondary air to make the exhaust gas air-fuel ratio of the exhaust gas flowing into the $NH_3$ purifying catalyst 12 equal to about 15.3 ($\lambda$=1.05).

As long as the exhaust gas air-fuel ratio of the exhaust gas flowing into the TW catalyst 8a is kept lean, unburned hydrocarbon HC and/or carbon monoxide, etc. in the inflowing exhaust gas are oxidized and purified at the TW catalyst 8a. Contrarily, when the exhaust gas air-fuel ratio of the inflowing exhaust gas is rich, there may be the case where the HC and/or the CO passes through the TW catalyst 8a and the $NH_3$-AO catalyst 10a. However, the HC and/or the CO then flows into the $NH_3$ purifying catalyst 12 and are oxidized and purified sufficiently, because the catalyst 12 is kept in an oxidizing atmosphere, as mentioned above.

To form the exhaust gas portions of which the exhaust gas air-fuel ratios are lean and rich respectively, there may be provided a secondary air supplying device for supplying the secondary air in, for example, the exhaust manifold 7. In this case, while the engine air-fuel ratio is kept rich, the supply of the secondary air is stopped to thereby form the exhaust gas portion of which exhaust gas air-fuel ratio is rich, and the secondary air is supplied to thereby form the exhaust gas portion of which exhaust gas air-fuel ratio is lean. Or, there may be provided with a secondary fuel supplying device for supplying the secondary fuel in, for example, the exhaust manifold 7. In this case, while the engine air-fuel ratio is kept lean, the supply of the secondary fuel is stopped to thereby form the exhaust gas portion of which exhaust gas air-fuel ratio is lean, and the secondary fuel is supplied to thereby form the exhaust gas portion of which exhaust gas air-fuel ratio is rich.

However, as mentioned above, the exhaust gas air-fuel ratio of the exhaust gas flowing into the catalysts 8a and 10a conforms to the engine air-fuel ratio, in the engine shown in FIG. 1. Therefore, the engine air-fuel ratio is controlled to be lean and rich alternately and repeatedly to thereby make the exhaust gas air-fuel ratio of the exhaust gas flowing into the catalysts 8a and 10a lean and rich alternately and repeatedly. Namely, the engine 1 operates a lean engine operation in which the engine air-fuel ratio is lean to thereby make the exhaust gas air-fuel ratio of the exhaust gas flowing into the catalysts 8a and 10a lean, and the engine 1 operates a rich engine operation in which the engine air-fuel ratio is rich to thereby make the exhaust gas air-fuel ratio of the exhaust gas flowing into the catalysts 8a and 10a rich, and the engine 1 operates the lean and rich engine operations alternately and repeatedly.

If a target value of the exhaust gas air-fuel ratio of the exhaust gas flowing into the catalysts 8a and 10a is referred as a target air-fuel ratio (A/F)T, the actual exhaust gas air-fuel ratio of the exhaust gas flowing into the catalysts 8a and 10a is made equal to the target air-fuel ratio (A/F)T, by making the target value of the engine air-fuel ratio equal to the target air-fuel ratio (A/F)T. Therefore, in the embodiment, the target value of the engine air-fuel ratio is conformed to the target air-fuel ratio (A/F)T. The target air-fuel ratio (A/F)T is made equal to a lean air-fuel ratio (A/F)L which is lean with respect to the stoichiometric air-fuel ratio (A/F)S, and equal to a rich air-fuel ratio (A/F)R which is rich with respect to the stoichiometric air-fuel ratio (A/F)S, alternately and repeatedly, to thereby make the exhaust gas air-fuel ratio of the exhaust gas flowing into the catalysts 8a and 10a lean and rich alternately and repeatedly. Note that, if an engine operation period during which the engine performs the lean engine operation is referred as a lean operation period TL, and if an engine operation period during which the engine performs the rich engine operation is referred as a rich operation period TR, one lean operation period TL and one rich operation period TR, next to each other, form a cycle.

In other words, $NO_x$ exhausted from the engine 1 is purified sufficiently and is prevented from being discharged to the outside air, by the engine operating in the lean and rich engine operating condition alternately and repeatedly.

The lean air-fuel ratio (A/F)L and the rich air-fuel ratio (A/F)R may be determined in accordance with the engine operating condition, respectively. However, in the present embodiment, the lean air-fuel ratio (A/F)L is set constant at about 25.0, and the rich air-fuel ratio (A/F)R is set constant at about 14.0, regardless the engine operating condition. Therefore, the target air-fuel ratio (A/F)T is made equal to about 25.0 when the lean engine operation is to be performed, and is made equal to about 13.8 when the rich engine operation is to be performed.

If the air-fuel mixture spreading over the entire combustion chamber is uniformly formed when the engine air-fuel ratio is very lean, such as 25.0, the spark plug 15 cannot ignite the air-fuel mixture, because the air-fuel mixture is very thin, and misfiring may occur. To solve this, in the engine shown in FIG. 1, an ignitable air-fuel mixture is formed in a restricted region in the combustion chamber and the reminder is filled with only the air or only the air and the EGR gas, and the air-fuel mixture is ignited by the spark plug 15, when the lean engine operation is to be performed. This prevents the engine from misfiring, even though the engine air-fuel ratio is very lean. Alternatively, the misfiring may be prevented by forming a swirl flow in the combustion chamber, while forming a uniform air-fuel mixture in the combustion chamber.

As mentioned at the beginning, a smaller fuel consumption rate is desired, and thus it is desired to make the lean operation period TL as long as possible, and to make the rich operation period TR as short as possible. In particular, it is preferable that TL/TR is equal to or larger than 3, for the smaller fuel consumption rate. However, as the lean operation period TL becomes longer, the $NH_3$ amount desorbed from the $NH_3$-AO catalyst 10a becomes smaller. Thus, too, a longer lean operation period TL may lead to make the $NH_3$ amount smaller than that required for purifying $NO_x$ in the $NH_3$-AO catalyst 10a, and thus $NO_x$ is discharged to the outside air without the reduction. To solve this problem, in this embodiment, an $NH_3$ amount adsorbed in the $NH_3$-AO catalyst 10a $S(NO_x)$ is obtained by obtaining an $NH_3$ amount desorbed from the $NH_3$-AO catalyst 10a during the lean engine operation, and the lean engine operation is stopped and the rich engine operation started when the adsorbed $NH_3$ amount $S(NH_3)$ becomes smaller than a predetermined minimum amount $MIN(NH_3)$. This prevents $NO_x$ flowing into the $NH_3$-AO catalyst 10a from being discharged to the outside air without being reduced.

On the other hand, a shorter rich operation period is preferable. However, if the rich operation period TR is made too short, the adsorbed $NH_3$ amount $S(NH_3)$ may be smaller than that required for the sufficient reduction of $NO_x$, and thereby $NO_x$ may be discharged without being reduced when the $NO_x$ amount flowing into the $NH_3$-AO catalyst 10a increases drastically. Further, too short a rich operation period may lead to frequent changes in the target air-fuel ratio (A/F)T between the lean and rich air-fuel ratios, and thus an undesired deterioration of the drivability may occur. However, if the rich operation period TR becomes longer, the $NH_3$-AO catalyst 10a is saturated with $NH_3$, and a large amount of $NH_3$ is discharged therefrom. To solve this problem, in this embodiment, the $NH_3$ amount adsorbed in the $NH_3$-AO catalyst 10a during the rich engine operation is obtained to thereby obtain the adsorbed $NH_3$ amount $S(NH_3)$, and the rich engine operation is stopped and the lean engine operation started when the adsorbed $NH_3$ amount $S(NH_3)$ becomes larger than a maximum amount $MAX(NH_3)$, which is determined in accordance with the adsorbing capacity of the $NH_3$-AO catalyst 10a. In this way, the lean and the rich operation periods TL and TR are determined in accordance with the adsorbed $NH_3$ amount $S(NH_3)$ of the $NH_3$-AO catalyst 10a, in the present embodiment.

It is difficult to directly determine the adsorbed $NH_3$ amount in the $NH_3$-AO catalyst 10a. Therefore, in this embodiment, the adsorbed $NH_3$ amount is estimated on the basis of the $NH_3$ amount synthesized in the TW catalyst 8a or flowing into the $NH_3$-AO catalyst 10a. In this case, a sensor for detecting the $NH_3$ amount flowing into the $NH_3$-AO catalyst 10a may be arranged in the exhaust passage between the TW catalyst 8a and the $NH_3$-AO catalyst 10a. However, in the embodiment, considering the applicability, the synthesized $NH_3$ amount is estimated on the basis of the $NO_x$ amount flowing into the TW catalyst 8a, and then the adsorbed $NH_3$ amount is estimated on the basis of the synthesized $NH_3$ amount. That is, the synthesized $NH_3$ amount per unit time becomes larger as the $NO_x$ amount flowing into the TW catalyst 8a per unit time becomes larger. Also, the synthesized $NH_3$ amount per unit time becomes larger as the synthesizing efficiency ETA becomes higher.

On the other hand, the $NO_x$ amount exhausted from the engine per unit time becomes larger as the engine speed N becomes higher, and thus the $NO_x$ amount flowing into the TW catalyst 8a per unit time becomes larger. Also, the exhaust gas amount exhausted from the engine becomes larger and the combustion temperature becomes higher as the engine load Q/N (the intake air amount Q/the engine speed N) becomes higher, and thus the $NO_x$ amount flowing into the TW catalyst 8a per unit becomes larger as the engine load Q/N becomes higher.

Figure 6A:
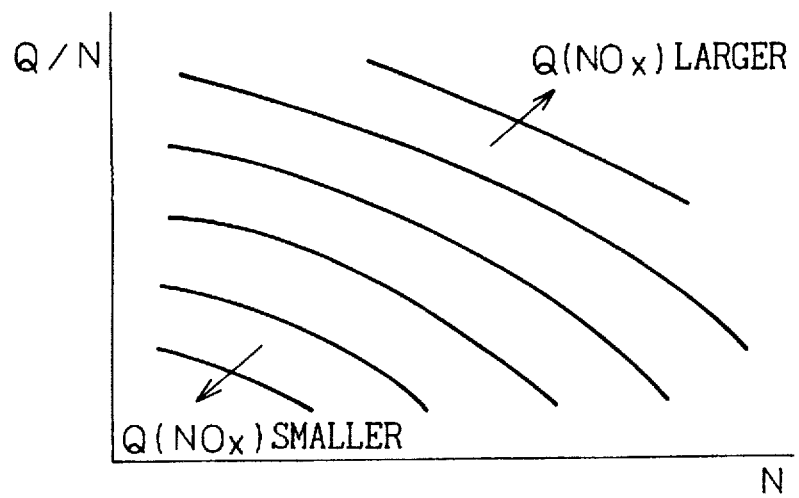
FIGS. 6A and 6B are diagrams illustrating the $NO_x$ amount exhausted from the engine per unit time.
Figure 6B:
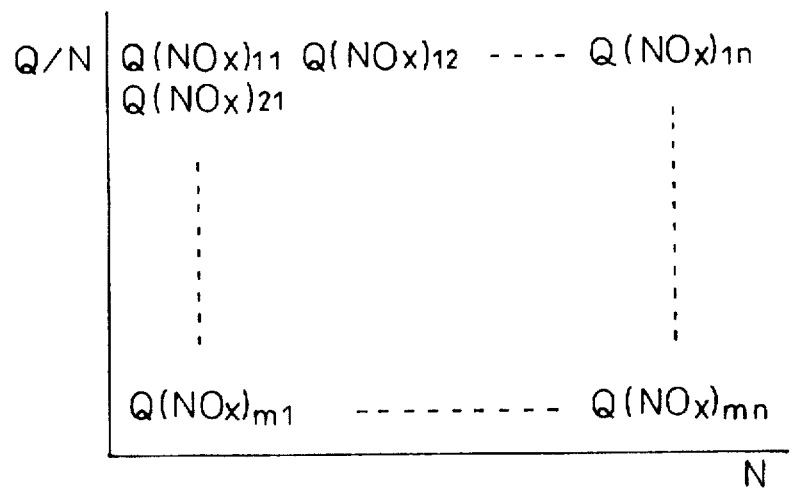

FIG. 6A illustrates the relationships, obtained by experiment, between the $NO_x$ amount exhausted from the engine per unit time $Q(NO_x)$, the engine load Q/N, and the engine speed N, with the constant lean or rich air-fuel ratio (A/F)L, (A/F)R. In FIG. 6A, the curves show the identical $NO_x$ amount. As shown in FIG. 6A, the exhausted $NO_x$ amount $Q(NO_x)$ becomes larger as the engine load Q/N becomes higher, and as the engine speed N becomes higher. Note that the exhausted $NO_x$ amount $Q(NO_x)$ is stored in the ROM 22 in advance in the form of a map as shown in FIG. 6B.

Figure 7:
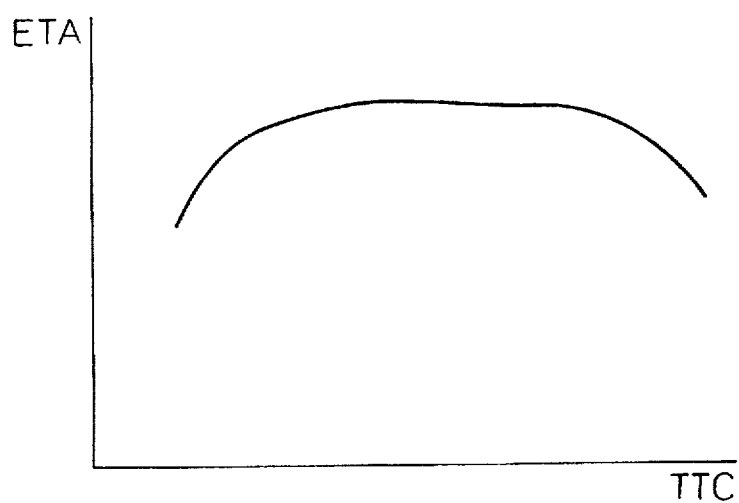
FIG. 7 is a diagram illustrating the $NH_3$ synthesizing efficiency of the three way catalyst.

The $NH_3$ synthesizing efficiency ETA varies in accordance with the temperature TTC of the exhaust gas flowing into the TW catalyst 8a, which represents the temperature of the TW catalyst 8a. That is, as shown in FIG. 7, the synthesizing efficiency ETA becomes higher as the exhaust gas temperature TTC becomes higher when TTC is low, and becomes lower as TTC becomes higher when TTC is high, with the constant rich air-fuel ratio (A/F)R. The synthesizing efficiency ETA is stored in the ROM 22 in advance in the form of a map as shown in FIG. 7.

Note that the exhausted $NO_x$ amount from the engine per unit time $Q(NO_x)$ varies in accordance with the engine air-fuel ratio. Therefore, if the lean or rich air-fuel ratio (A/F)L, (A/F)R is changed in accordance with, for example, the engine operating condition, the exhausted $NO_x$ amount $Q(NO_x)$ obtained by the map shown in FIG. 6B is required to be corrected on the basis of the actual lean or rich air-fuel ratio (A/F)L, (A/F)R. Further, the synthesizing efficiency ETA also varies in accordance with the exhaust gas air-fuel ratio of the exhaust gas flowing into the TW catalyst 8a, that is, the rich air-fuel ratio (A/F)R, as shown in FIG. 2. Therefore, if the rich air-fuel ratio (A/F)R is changed in accordance with, for example, the engine operating condition, the synthesizing efficiency ETA obtained by the map shown in FIG. 7 must also be corrected on the basis of the actual rich air-fuel ratio (A/F)R.

The product of $Q(NO_x)$ calculated using the engine load Q/N and the engine speed N and the synthesizing efficiency ETA calculated using the exhaust gas temperature TTC represents the $NH_3$ amount flowing into the $NH_3$-AO catalyst 10a per unit time. Accordingly, during the rich engine operation, the $NH_3$ amount adsorbed in the $NH_3$-AO catalyst 10a is calculated using the following equation:

$$S(NH_3)=S(NH_3)+Q(NO_x)\cdot ETA\cdot DELTAa$$

where DELTAa represents the time interval of calculation of $Q(NO_x)$ and ETA. Thus, $Q(NO_x)\cdot ETA\cdot DELTAa$ represents the $NH_3$ amount adsorbed in the $NH_3$-AO catalyst 10a from the last calculation of $Q(NO_x)$ and ETA until the present calculation.

Figure 8A:
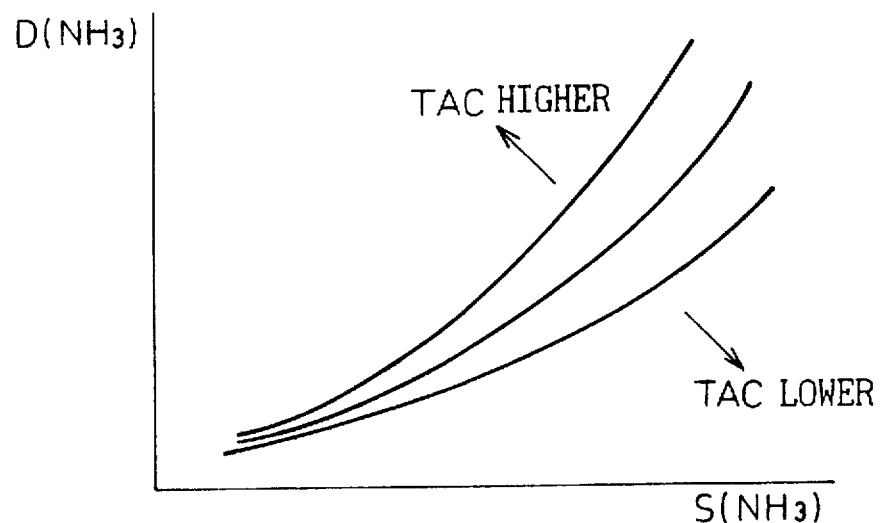
FIGS. 8A and 8B are diagrams illustrating the $NH_3$ amount desorbed from the $NH_3$ adsorbing and oxidizing catalyst per unit time.
Figure 8B:
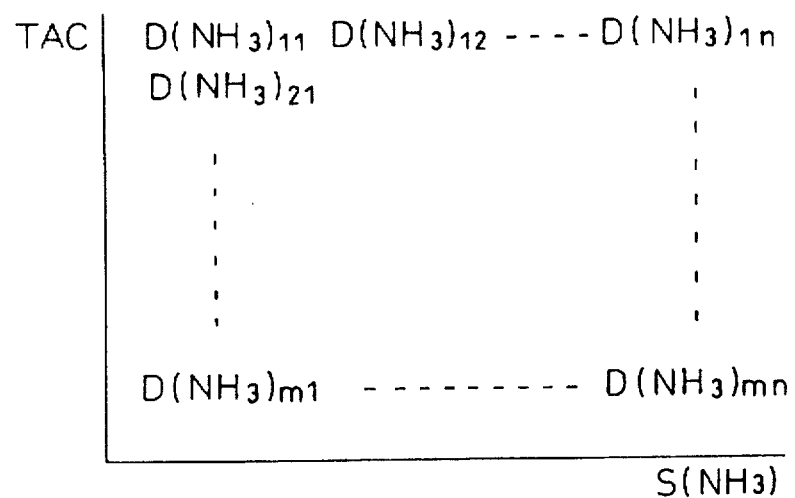

FIG. 8A illustrates the $NH_3$ amount $D(NH_3)$ desorbed from the $NH_3$-AO catalyst 10a per unit time, when the exhaust gas air-fuel ratio of the exhaust gas flowing into the $NH_3$-AO catalyst 10a is changed from rich to lean, as obtained by experiment. In FIG. 8A, the curves show the identical desorbed $NH_3$ amount. As shown in FIG. 8A, the desorbed $NH_3$ amount $D(NH_3)$ becomes larger as the adsorbed $NH_3$ amount $S(NH_3)$ becomes larger. Also, $D(NH_3)$ becomes larger as the temperature TAC of the exhaust gas flowing into the $NH_3$-AO catalyst 10a, which represents the temperature of the $NH_3$-AO catalyst 10a, becomes higher. The desorbed $NH_3$ amount $D(NH_3)$ is stored in the ROM 22 in advance in the form of a map as shown in FIG. 8B.

Accordingly, during the lean engine operation, the adsorbed $NH_3$ amount $S(NH_3)$ is calculated using the following equation:

$$S(NH_3)=S(NH_3)-D(NH_3)\cdot DELTAd$$

where DELTAd represents the time interval of the calculation of $D(NH_3)$, and thus $D(NH_3)\cdot DELTAd$ represents the $NH_3$ amount desorbed from the $NH_3$-AO catalyst 10a, from the last calculation of $D(NH_3)$ until the present calculation.

To obtain the temperature TTC of the exhaust gas flowing into the TW catalyst 8a, and the temperature TAC of the exhaust gas flowing into the $NH_3$-AO catalyst 10a, temperature sensors 33a and 33b are arranged in the exhaust passage directly upstream of the TW catalyst 8a and directly upstream of the $NH_3$-AO catalyst 10a, respectively, in the engine shown in FIG. 1. Alternatively, the exhaust gas temperatures can be estimated on the basis of the engine operating condition, such as the engine load Q/N, the engine speed N, and the engine air-fuel ratio.

In this embodiment, one lean operation period TL is performed for several minutes, and one rich operation period is performed for several seconds, for example. Therefore, in this embodiment, the engine 1 performs the lean engine operation basically, and performs the rich engine operation temporarily. In this case, a plurality of cylinders perform the lean engine operation during the lean engine operation, and a plurality of cylinders perform the rich engine operation during the rich engine operation. Note that the lean and the rich operation periods may be predetermined in the form of a time.

If an endurance temperature of a catalyst is defined as a temperature that the catalyst quickly deteriorates and the durability thereof is remarkably lowered if the catalyst temperature is higher than that temperature, it has been found by the inventors of the present invention that the endurance temperature of the Cu-zeolite catalyst as the $NH_3$-AO catalyst 10a varies in accordance with the exhaust gas air-fuel ratio of the inflowing exhaust gas. Namely, it has been found that the rich endurance temperature, which is the endurance temperature when the exhaust gas air-fuel ratio of the inflowing exhaust gas is rich, of the Cu-zeolite catalyst is about 500° C., and that the lean endurance temperature, which is the endurance temperature when the exhaust gas air-fuel ratio of the inflowing exhaust gas is lean, of the Cu-zeolite catalyst is higher than the rich endurance temperature of the Cu-zeolite catalyst and is about 600° C. Further, it has been found that a stoichiometric endurance temperature, which is the endurance temperature when the exhaust gas air-fuel ratio of the inflowing exhaust gas is stoichiometric, of the Cu-zeolite catalyst is also higher than the rich endurance temperature of the Cu-zeolite catalyst. Note that, while the following explanation will be made by using an example where the $NH_3$-AO catalyst is constructed as the Cu-zeolite catalyst, the similar explanation will be made even if the $NH_3$-AO catalyst is constructed as those as described above.

In the Cu-zeolite catalyst, copper Cu is carried in the form of copper oxide CuO. Thus, it is considered that, when the exhaust gas air-fuel ratio of the inflowing exhaust gas is rich, that is, when the Cu-zeolite catalyst is under the reducing atmosphere, if the catalyst temperature becomes higher than the endurance temperature, copper oxide CuO is reduced to copper Cu and the copper particles fall out from the carrier, and thereby the deterioration of the Cu-zeolite catalyst proceeds faster than that in the usual use.

In this embodiment, the exhaust gas portions of which the exhaust gas air-fuel ratios are lean and rich flow in to the Cu-zeolite catalyst alternately and repeatedly. In this condition, when the exhaust gas portion of which the exhaust gas air-fuel ratio is lean flows into the Cu-zeolite catalyst, the catalyst will not remarkably deteriorate as long as the catalyst temperature is lower than the lean endurance temperature, even though the catalyst temperature is higher than the rich endurance temperature. However, the Cu-zeolite catalyst will deteriorate remarkably, if the catalyst temperature exceeds the rich endurance temperature when the exhaust gas portion of which the exhaust gas air-fuel ratio is rich is to be continuously introduced into the catalyst, or if the catalyst temperature has been higher than the rich endurance temperature when the exhaust gas air-fuel ratio of the exhaust gas portion flowing into the catalyst is to be changed from lean to rich. Thus, if the catalyst temperature becomes higher than the rich endurance temperature or has been higher than the rich endurance temperature when the exhaust gas air-fuel ratio of the inflowing exhaust gas is to be made rich, the remarkable deterioration of the catalyst is prevented by prohibiting the exhaust gas air-fuel ratio of the inflowing exhaust gas from being made rich. In other words, if the exhaust gas air-fuel ratio is made lean or stoichiometric, the endurance temperature of the Cu-zeolite catalyst is made higher and the catalyst temperature at this time becomes lower than the endurance temperature, and therefore the remarkable deterioration of the catalyst is prevented.

There may be provided a device for feeding secondary air to the Cu-zeolite catalyst and an additional air-fuel ratio sensor for detecting the exhaust gas air-fuel ratio of the inflowing exhaust gas, and the exhaust gas air-fuel ratio of the inflowing exhaust gas may be controlled not to be rich by controlling the amount of the secondary air on the basis of the output signals of the additional air-fuel ratio sensor.

However, as mentioned above, the exhaust gas air-fuel ratio of the exhaust gas flowing the Cu-zeolite catalyst conforms to the engine air-fuel ratio in the engine shown in FIG. 1. Further, the temperature of the inflowing exhaust gas TAC represents the catalyst temperature. Thus, in this embodiment, if the exhaust gas is equal to or higher than a predetermined, upper threshold temperature UTR when the rich engine operation is to be performed, the lean engine operation is performed. Namely, if TAC≧UTR when the rich operation is performed or when the engine operation is to be changed from the lean operation to the rich operation, the engine operation is changed to the lean operation or is kept the lean operation. Note that the upper threshold UTR is obtained in advance, by experiment, so that the actual catalyst temperature is equal to or higher than the rich endurance temperature when the exhaust gas temperature TAU is equal to or higher than the upper threshold UTR.

As mentioned above, the adsorbed $NH_3$ amount $S(NH_3)$ decreases when the engine performs the lean operation. Even if the adsorbed amount $S(NH_3)$ falls below the minimum amount $MIN(NH_3)$, the rich operation is prohibited as long as TAC≧UTR, to ensure the catalyst durability. However, if the lean operation is continued after $S(NH_3)$<$MIN(NH_3)$, the $NH_3$ amount becomes insufficient to purify the $NO_x$ flowing into the Cu-zeolite catalyst, and to discharge the $NO_x$ without the reduction. Therefore, in this embodiment, if $S(NH_3)$<$MIN(NH_3)$ when the rich operation is prohibited, the target air-fuel ratio (A/F)T is set to the stoichiometric air-fuel ratio (A/F)S, that is, a stoichiometric engine operation is performed. When the target air-fuel ratio (A/F)T is set to the stoichiometric air-fuel ratio (A/F)S, $NO_x$, HC, and CO in the exhaust gas are purified in the TW catalyst 8a sufficiently and simultaneously, as shown in FIG. 2.

On the other hand, when the exhaust gas temperature TAC becomes lower than the upper threshold UTR, the rich operation is started or resumed. As a result, the synthesizing of $NH_3$ used for purifying $NO_x$ is performed. Namely, the basic method of the exhaust gas purification of the embodiment is performed, and good purification of the exhaust gas is ensured.

The lean air-fuel ratio for the lean operation which is performed when the rich operation is prohibited may be set to any air-fuel ratio, as long as the catalyst durability is ensured. However, if the lean air-fuel ratio is made slightly lean with respect to the stoichiometric air-fuel ratio, the exhaust gas temperature TAC becomes higher than that when the rich operation is performed with the rich air-fuel ratio of 14.0. As a result, the exhaust gas temperature TAC does not become lower than the upper threshold UTR, and the rich operation cannot be resumed. Thus, in this embodiment, the lean air-fuel ratio for the lean operation performed when the rich operation is prohibited is set to make the exhaust gas temperature TAC lower than that in the rich operation. Namely, the lean air-fuel ratio is set and kept constant, regardless the engine operation, to about 25.0, in this embodiment. When the lean air-fuel ratio is made very lean, such as 25.0, the exhaust gas temperature is considerably lower than that in the rich operation. As a result, the Cu-zeolite catalyst is quickly cooled and the temperature thereof quickly becomes lower than the rich endurance temperature. Thus, the rich operation is quickly resumed.

FIGS. 9A to 9E illustrate a routine for executing the control of the engine operation periods. The routine is executed by interruption every predetermined crank angle.

Figure 9A:
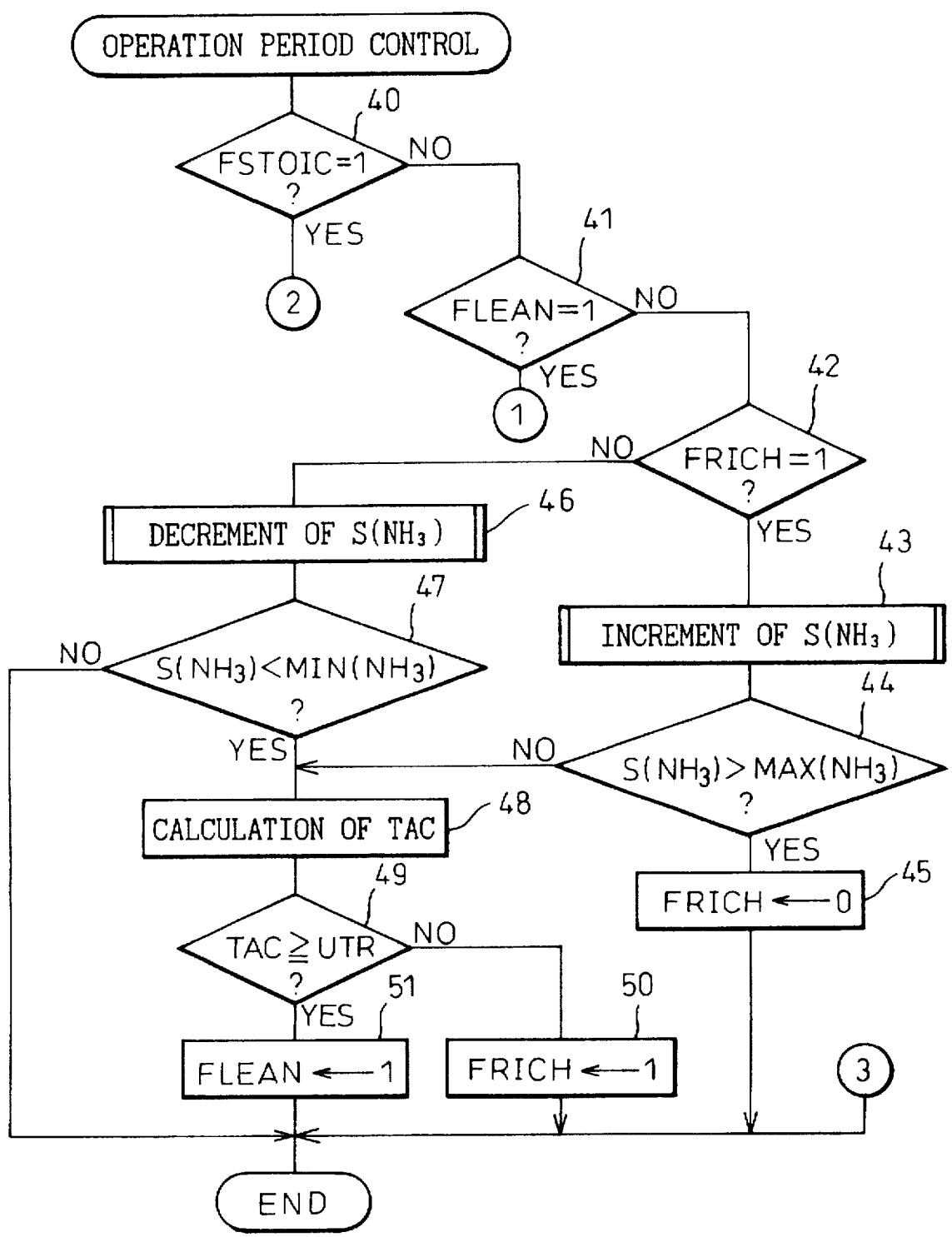
FIGS. 9A to 9E illustrate a flow chart for controlling the operation period.

Referring to FIGS. 9A to 9E, first, in step 40 in FIG. 9A, it is judged whether FSTOIC is made 1. FSTOIC is made 1 when the rich operation is prohibited and the stoichiometric operation is to be performed, and is made zero in the other situation. FSTOIC is usually made zero and the routine goes to step 41, where it is judged whether FLEAN is made 1. FLEAN is made 1 when the rich operation is prohibited and the lean operation is to be performed, and is made zero in the other situation. FLEAN is usually made zero and the routine goes to step 42, where it is judged whether FRICH is made 1. FRICH is made 1 when the rich operation is to be performed, and is made zero when the lean operation is to be performed. If FRICH is set to 1, the routine goes to step 43, where adsorbed $NH_3$ amount $S(NH_3)$ is calculated. When the routine goes to step 43 with FRICH=1, the rich operation is performed and the adsorbed $NH_3$ amount is increased. Thus, in the step 43, an increment of the adsorbed $NH_3$ amount is performed. That is, the increment process shown in FIG. 9D, and described below, is performed in the step 43. In the following step 44, it is judged whether the adsorbed $NH_3$ amount $S(NH_3)$ is larger than the maximum amount $MAX(NH_3)$. If $S(NH_3)$>$MAX(NH_3)$, the routine goes to step 45, where FRICH is made zero, and then the processing cycle is ended. Namely, if $S(NH_3)$>$MAX(NH_3)$, the adsorbed $NH_3$ amount is sufficient to purify $NO_x$, and the rich operation is stopped and the lean operation is started. Accordingly, the rich operation period TR is a period from when FRICH is made 1 until $S(NH_3)$>$MAX(NH_3)$.

If $S(NH_3)$≦$MAX(NH_3)$, in step 44, the routine jumps to step 48.

If FRICH=0, in step 42, the routine goes to step 46, where the adsorbed $NH_3$ amount $S(NH_3)$ is calculated. When the routine goes to step 46 with FRICH=0, the lean operation is performed and the adsorbed $NH_3$ amount is decreased. Thus, in the step 46, a decrement of the adsorbed $NH_3$ amount is performed. That is, the decrement process shown in FIG. 9E, and described below, is performed in the step 46. In the following step 47, it is judged whether the adsorbed $NH_3$ amount $S(NH_3)$ is smaller than the minimum amount MIN $(NH_3)$. If $S(NH_3)$≧$MIN(NH_3)$, the processing cycle is ended. Namely if $S(NH_3)$≧$MIN(NH_3)$, the adsorbed $NH_3$ amount $S(NH_3)$ is judged to be still large to purify $NO_x$, and thus the lean operation is continued. If $S(NH_3)$<$MIN(NH_3)$, the routine goes to step 48. Accordingly, the routine goes to step 48 when the rich operation is performed and $S(NH_3)$ is smaller than $MAX(NH_3)$, that is, the rich operation is to be continued, from step 44, or when the lean operation is performed and $S(NH_3)$ becomes smaller than $MIN(NH_3)$, that is, the rich operation is to be started, from step 47.

In step 48, the exhaust gas temperature TAC is obtained. In the following step 49, the it is judged whether the exhaust gas temperature TAC is equal to or higher than the upper threshold UTR. If TAC<UTR, the routine goes to step 50, where FRICH is set or kept to 1, and then the processing cycle is ended. Namely, when TAC<UTR, the durability of the Cu-zeolite catalyst is judged to be ensured, and thus the rich operation is continued or started. That is, when the routine goes from step 44 to step 50, via steps 48 and 49, $S(NH_3)$ is equal to or smaller than $MAX(NH_3)$. In this condition, the adsorbed $NH_3$ amount is judged to be still insufficient to purify $NO_x$, and thus the rich operation is continued. On the other hand, when the routine goes from step 47 to step 50, via steps 48 and 49, $S(NH_3)$ is smaller than $MIN(NH_3)$. In this condition, the adsorbed $NH_3$ amount is judged to be insufficient to purify $NO_x$, and thus the rich operation is started. Accordingly, the lean operation period TL is from when the FRICH is made zero until $S(NH_3)$<$MIN(NH_3)$. Contrarily, if TAC≧UTR, the routine goes to step 51, where FLEAN is made 1 and the processing cycle is ended. Namely, if TAC≧UTR, the durability is judged to be lowered by the rich operation, and the rich operation is prohibited.

Figure 9B:
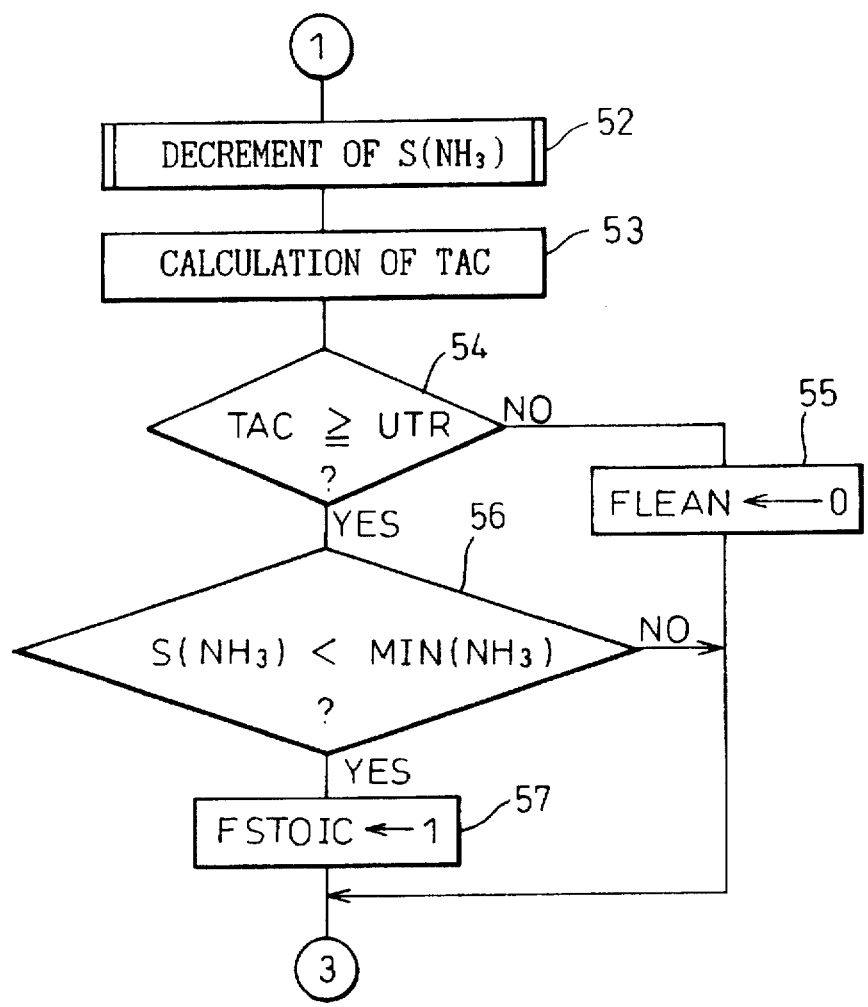

When FLEAN=1, the routine goes from step 41 to step 52 in FIG. 9B, where the adsorbed $NH_3$ amount is calculated. When FLEAN=1 and FSTOIC=0, the lean operation is performed and the adsorbed $NH_3$ amount is decreasing. Thus, in the step 52, the decrement of the adsorbed $NH_3$ amount shown in FIG. 9E is performed. In the following step 53, the exhaust gas temperature TAC is calculated. In the following step 54, it is judged whether TAC≧UTR. If TAC<UTR, the routine goes to step 55, where FLEAN is set to zero, and then the processing cycle is ended. Namely, when TAC<UTR, it is judged that the catalyst endurance is not lowered even if the rich operation is performed, and the lean operation is stopped. In this condition, FRICH=1 and the thus rich operation is started.

If TAC≧UTR in step 54, the routine goes to step 56, where it is judged whether the adsorbed $NH_3$ amount $S(NH_3)$ is smaller than the minimum amount $MIN(NH_3)$. If $S(NH_3)≧MIN(NH_3)$, the processing cycle is ended. Namely, if $S(NH_3)≧MIN(NH_3)$, the adsorbed $NH_3$ amount $S(NH_3)$ is judged to be still large to purify $NO_x$, and thus the lean operation is continued. If $S(NH_3)<MIN(NH_3)$, the routine goes to step 57, where FSTOIC is set to 1, and then the processing cycle is ended. Namely if $S(NH_3)<MIN(NH_3)$, the adsorbed $NH_3$ amount $S(NH_3)$ is judged to be insufficient to purify $NO_x$, and the stoichiometric operation is started.

Figure 9C:
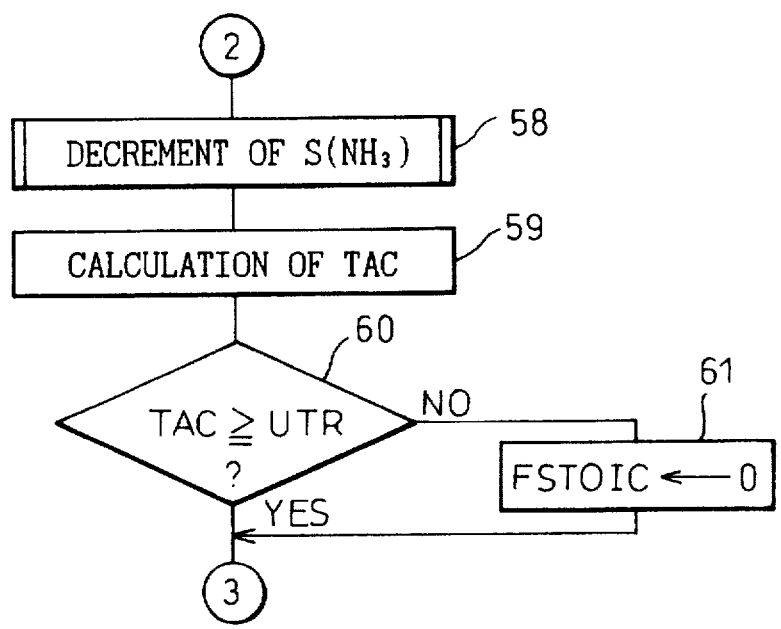

When FSTOIC=1, the routine goes from step 40 to step 58 in FIG. 9C, where the adsorbed $NH_3$ amount is calculated. When FSTOIC=1, the adsorbed $NH_3$ amount is decreasing, and thus, in the step 52, the decrement of the adsorbed $NH_3$ amount shown in FIG. 9E is performed. In the following step 59, the exhaust gas temperature TAC is calculated. In the following step 60, it is judged whether TAC≧UTR. If TAC<UTR, the routine goes to step 61, where FSTOIC is set to zero, and then the processing cycle is ended. Namely, when TAC<UTR, it is judged that the catalyst endurance is not lowered even if the rich operation is performed, and the stoichiometric operation is stopped. In this condition, FRICH=1 and the thus rich operation is started. If TAC≧UTR, in step 60, the processing cycle is ended. Namely, the stoichiometric operation is continued.

Figure 9D:
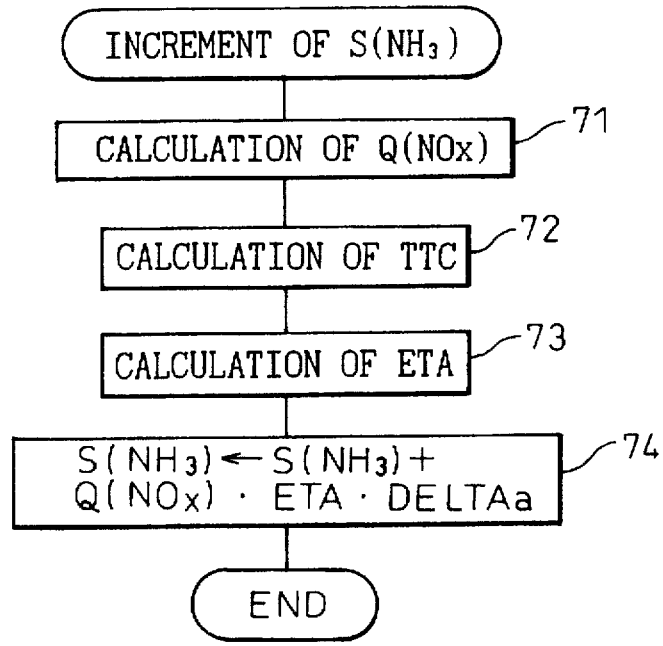
Figure 9E:
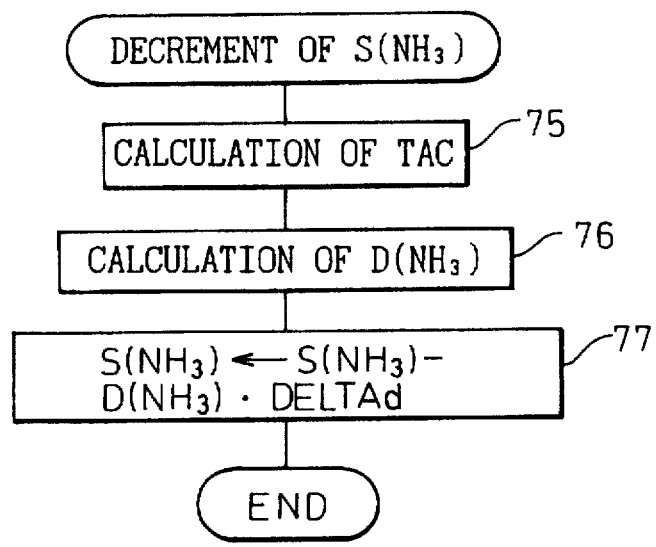

FIG. 9D shows an increment processing of $S(NH_3)$ performed in step 43 in FIG. 9A.

Referring to FIG. 9D, in step 71, the exhausted $NO_x$ amount $Q(NO_x)$ is calculated using the map shown in FIG. 6B, on the basis of the engine load Q/N and the engine speed N. In the following step 72, the exhaust gas temperature TTC is obtained. In the following step 73, the $NH_3$ synthesizing efficiency ETA is calculated using the map shown in FIG. 7. In the following step 74, the adsorbed $NH_3$ amount $S(NH_3)$ is calculated using the following equation:

$$S(NH_3)=S(NH_3)+Q(NO_x)\cdot ETA \cdot DELTAa$$

where DELTAa is a time interval from the last processing cycle until the present processing cycle, and is obtained by, for example, a timer. Then, the processing cycle is ended.

FIG. 9E shows a decrement processing of $S(NH_3)$ performed in steps 46 in FIG. 9A, 55 in FIG. 9B, and 58 in FIG. 9C.

Referring to FIG. 9E, in step 75, the exhaust gas temperature TAC is obtained. In the following step 76, the desorbed $NH_3$ amount $D(NH_3)$ is calculated using the map shown in FIG. 8B, on the basis of TAC and the present $S(NH_3)$. In the following step 77, the adsorbed $NH_3$ amount $S(NH_3)$ is calculated using the following equation:

$$S(NH_3)=S(NH_3)-D(NH_3)\cdot DELTAd$$

where DELTAd is a time interval from the last processing cycle until the present processing cycle. Then, the processing cycle is ended.

Figure 10:
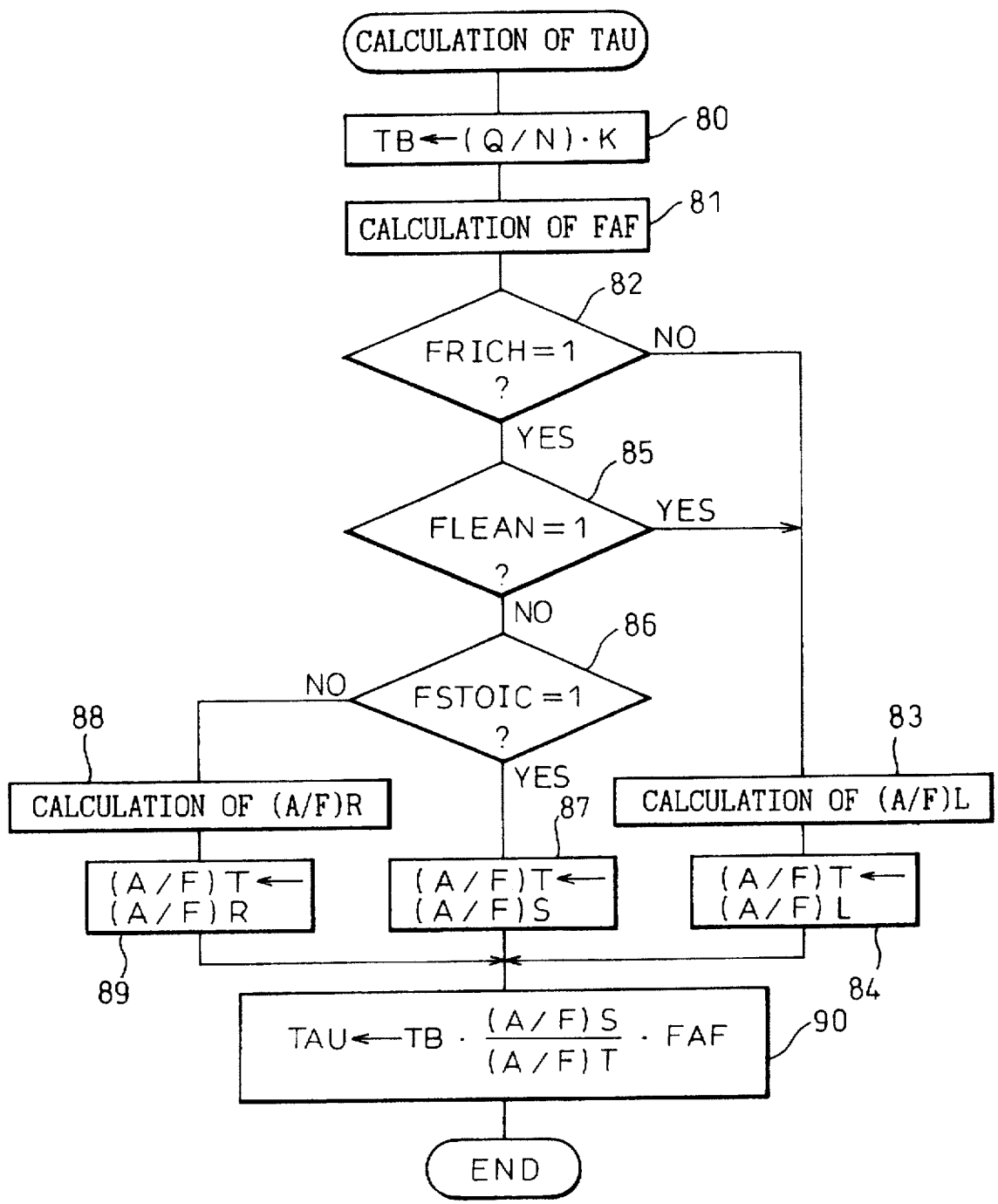
FIG. 10 is a flow chart for calculating the fuel injection time.

FIG. 10 illustrates the routine for calculating the fuel injection time TAU.

Referring to FIG. 10, first, in step 80, the basic fuel injection time TB is calculated using the following equation, on the basis of the engine load Q/N and the engine speed N:

$$TB=(Q/N)\cdot K$$

In the following step 81, the feedback correction coefficient FAF is calculated. In the following step 82, it is judged whether FRICH, which is controlled in the routine shown in FIGS. 9A to 9E, is made 1. If FRICH=0, that is, if the lean operation is to be performed, the routine goes to step 83, where the lean air-fuel ratio (A/F)L is calculated. In this embodiment, the lean air-fuel ratio (A/F)L is kept constant at 25.0 regardless the engine operating condition, and thus the lean air-fuel ratio (A/F)L is made 25.0 in step 83. In the following step 84, the lean air-fuel ratio (A/F)L is memorized as the target air-fuel ratio (A/F)T. Thus, the lean operation is performed. Next, the routine goes to step 90.

If FRICH=1 in step 82, that is, if the rich operation is to be performed, the routine goes to step 85, where it is judged whether FLEAN, which is controlled in the routine shown in FIGS. 9A to 9E, is made 1. If FLEAN=1, that is, if the rich operation is to be prohibited and the lean operation is to be performed, the routine goes to steps 83 and 84. Thus, the lean operation is performed.

If FLEAN=0 in step 85, that is, if the rich operation is to be prohibited and the lean operation is not to be performed, the routine goes to step 86, where it is judged whether FSTOIC, which is controlled in the routine shown in FIGS. 9A to 9E, is made 1. If FSTOIC=1, that is, if the rich operation is to be prohibited and the stoichiometric operation is to be performed, the routine goes to step 87, where the target air-fuel ratio (A/F)T is set to the stoichiometric air-fuel ratio (A/F)S. Thus, the stoichiometric operation is performed. Then, the routine goes to step 90.

If FSTOIC=0, that is, if the rich operation is to be performed, more precisely, if the rich operation is to be performed and if there is no need to prohibit the rich operation, the routine goes to step 88, where the rich air-fuel ratio (A/F)R is calculated. In this embodiment, the rich air-fuel ratio (A/F)R is kept constant at 14.0 regardless the engine operating condition, and thus the rich air-fuel ratio (A/F)R is made 14.0 in step 88. In the following step 64, the rich air-fuel ratio (A/F)R is memorized as the target air-fuel ratio (A/F)T. Next, the routine goes to step 90.

In step 90, the fuel injection time TAU is calculated using the following equation:

$$TAU=TB\cdot((A/F)S/(A/F)T)\cdot FAF$$

Each fuel injector 5 injects the fuel for the fuel injection time TAU.

In the embodiment mentioned above, the exhaust gas can be purified sufficiently using a single exhaust passage, that is, without providing a plurality of exhaust passages. Accordingly, the structure of the exhaust gas purifying device is kept small and simple.

Figure 5:
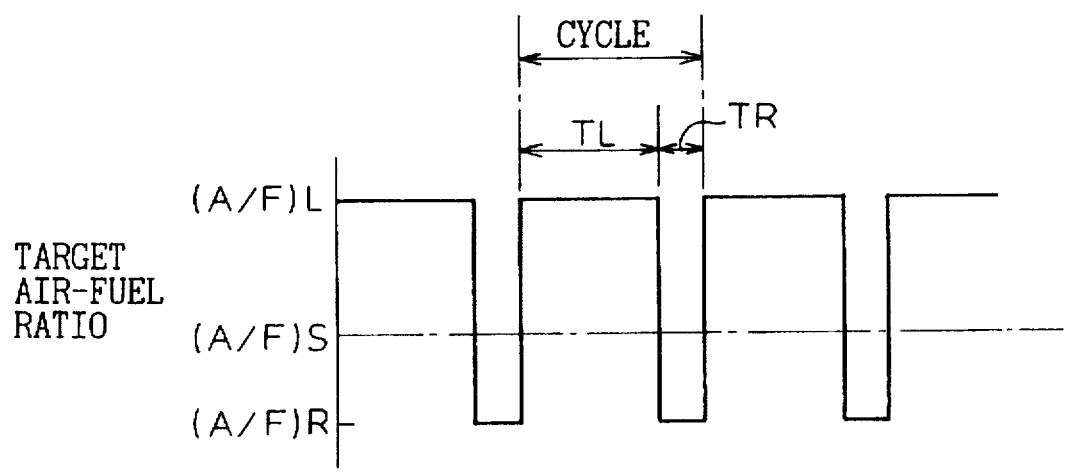
FIG. 5 is a time chart for explaining the exhaust gas purifying method in the engine shown in FIG. 1.

On the other hand, if a ratio of the number of the cylinders which performs the lean engine operation to the number of the cylinders which performs the rich engine operation in one cycle (see FIG. 5) is referred as a cylinder number ratio RATIO, it is desired to make the cylinder number ratio RATIO as large as possible, to thereby make the fuel consumption rate as small as possible. However, if a part of the cylinders performs the rich engine operation and the other performs the lean engine operation as in the prior art device mentioned at the beginning, the cylinder number ratio RATIO is limited. That is, in the four-cylinders engine, for example, the ratio RATIO is limited to 3 and cannot be made larger than 3. Thus, the decrease of the fuel consumption rate is limited, with the identical lean and rich air-fuel ratio (A/F)L and (A/F)R. Contrarily, in the embodiment, the ratio RATIO is allowed to be made larger until the $NO_x$ amount flowing into the $NH_3$-AO catalyst 10a exceeds the $NH_3$ amount desorbed from the catalyst 10a. In particular, the cylinder number ratio RATIO can be made larger than 3 in a four-cylinder engine. As a result, the fuel consumption rate can be made lower.

Further, if the first cylinder #1 continuously performs the rich operation and the second, third, and fourth cylinders #2, #3, and #4 continuously perform the lean operation, for example, as in the prior art, a large temperature difference between the exhaust gases exhausted from the cylinders #1 to #4 may occur, and may lead a larger temperature drop in the engine body or in the exhaust manifold 7, to thereby lead a large thermal distortion therein. Furthermore, in this example, a large amount of the deposition may exist in the first cylinder #1 which performs the rich operation continuously. Contrarily, in this embodiment, a cylinder in which the lean or rich operation is to be performed is not specified, that is, every cylinder performs both of the lean and rich operations. Accordingly, the large thermal distortion in the engine body or in the exhaust manifold 7 is prevented, and the large amount of the deposition on the particular cylinder is also prevented.

Additionally, the exhaust gas purifying method according to the present embodiment may be used in a single cylinder engine.

Further, the $NH_3$-AO catalyst 10a is comprised of the Cu-zeolite catalyst. Alternatively, the $NH_3$-AO catalyst may be comprised of any catalyst comprising zeolite carrying a metal, or any catalyst comprising palladium Pd.

According to the present invention, it is possible to provide a device for purifying an exhaust gas of an engine which can ensure the durability of the catalyst.

While the invention has been described by reference to specific embodiments chosen for purposes of illustration, it should be apparent that numerous modifications could be made thereto by those skilled in the art without departing from the basic concept and scope of the invention.

We claim:

1. A device for purifying an exhaust gas of an engine having an exhaust passage, comprising:
    an exhaust gas purifying catalyst arranged in the exhaust passage, of which an endurance temperature when an exhaust gas air-fuel ratio of the inflowing exhaust gas is lean or stoichiometric is higher than a rich endurance temperature which is an endurance temperature when an exhaust gas air-fuel ratio of the inflowing exhaust gas is rich;
    exhaust gas air-fuel ratio control means for controlling the exhaust gas air-fuel ratio of the exhaust gas flowing into the exhaust gas purifying catalyst;
    making-rich means adapted for controlling the exhaust gas air-fuel ratio control means to make the exhaust gas air-fuel ratio of the exhaust gas flowing into the exhaust gas purifying catalyst rich; and
    avoiding-rich means for controlling the exhaust gas air-fuel ratio control means to make the exhaust gas air-fuel ratio of the exhaust gas flowing into the exhaust gas purifying catalyst lean or stoichiometric when the making-rich operation of the making-rich means is to be performed and when a temperature representing a temperature of the exhaust gas purifying catalyst is equal to or higher than the rich endurance temperature.

2. A device according to claim 1, wherein the exhaust gas purifying catalyst includes zeolite carrying a material.

3. A device according to claim 1, wherein the exhaust gas purifying catalyst includes palladium.

4. A device according to claim 1, wherein the exhaust gas purifying catalyst comprises an $NH_3$ adsorbing and oxidizing ($NH_3$-AO) catalyst adsorbing $NH_3$ in the inflowing exhaust gas therein, and desorbing the adsorbed $NH_3$ therefrom and oxidizing the $NH_3$ when the $NH_3$ concentration in the inflowing exhaust gas becomes lower, wherein the device further comprises: an $NH_3$ synthesizing catalyst adapted to be arranged in the exhaust passage upstream of the exhaust gas purifying catalyst, the $NH_3$ synthesizing catalyst synthesizing $NH_3$ from at least a part of $NO_x$ in the inflowing exhaust gas when the exhaust gas air-fuel ratio of the inflowing exhaust gas is rich, and passing $NO_x$ in the inflowing exhaust gas therethrough when the exhaust gas air-fuel ratio of the inflowing exhaust gas is lean, and; introducing means for introducing the exhaust gas of which the exhaust gas air-fuel ratio is controlled by the exhaust gas air-fuel ratio control means into the $NH_3$ synthesizing catalyst prior to the exhaust gas purifying catalyst, and wherein the making-rich means performs the making-rich operation thereof when $NH_3$ is to be synthesized in the $NH_3$ synthesizing catalyst and to be adsorbed in the exhaust gas purifying catalyst, and stops the making-rich operation thereof when the adsorbed $NH_3$ is to be desorbed from the $NH_3$-AO catalyst.

5. A device according to claim 4, wherein the device further comprises making-lean means adapted for controlling the exhaust gas air-fuel ratio control means to make the exhaust gas air-fuel ratio of the exhaust gas flowing into the catalysts lean, and wherein the making-lean means performs the making-lean operation thereof when the making-rich means stops the making-rich operation thereof, and stops the making-lean operation thereof when the making-rich means performs the making-rich operation thereof.

6. A device according to claim 5, wherein the device further comprises adsorbed $NH_3$ amount estimating means for estimating an amount of $NH_3$ adsorbed in the $NH_3$-AO catalyst, and wherein the making-rich means performs the making-rich operation thereof and the making-lean means stops the making-lean operation thereof when the estimated adsorbed $NH_3$ amount becomes smaller than a lower threshold amount, and the making-rich means stops the making-rich operation thereof and the making-lean means stops the making-lean operation thereof when the estimated adsorbed $NH_3$ amount becomes larger than an upper threshold amount.

7. A device according to claim 6, wherein the avoiding-rich means makes the exhaust gas air-fuel ratio of the exhaust gas flowing into the catalysts one of lean and stoichiometric in accordance with the estimated adsorbed $NH_3$ amount.

8. A device according to claim 7, wherein the avoiding-rich means makes the exhaust gas air-fuel ratio of the exhaust gas flowing into the catalysts lean when the estimated adsorbed $NH_3$ amount is larger than the lower threshold amount, and makes the exhaust gas air-fuel ratio of the exhaust gas flowing into the catalysts stoichiometric when the estimated adsorbed $NH_3$ amount is smaller than the lower threshold amount.

9. A device according to claim 4, wherein the $NH_3$ synthesizing catalyst is a three-way catalyst including at least one precious metal.

10. A device according to claim 9, wherein the at least one precious metal is selected from a group including palladium, platinum and rhodium.

11. A device according to claim 1, wherein the exhaust gas air-fuel ratio control means comprises an engine air-fuel ratio control means for controlling an engine air-fuel ratio of the engine, the exhaust gas air-fuel ratio control means controlling the exhaust gas air-fuel ratio by controlling the engine air-fuel ratio of the engine.

12. A device according to claim 1, wherein the exhaust air-fuel ratio of the exhaust gas flowing into the exhaust gas purifying catalyst when the avoiding-rich means performs the avoiding-rich operation thereof is selected for the exhaust gas purifying catalyst to be cooled by the exhaust gas.

13. A device according to claim 1, wherein the temperature representing the temperature of the catalyst is a temperature of the exhaust gas flowing into the catalyst.

* * * * *

UNITED STATES PATENT AND TRADEMARK OFFICE
CERTIFICATE OF CORRECTION

PATENT NO. : 5,782,087
DATED : July 21, 1998
INVENTOR(S) : Yukio Kinugasa, et al.

It is certified that error appears in the above-identified patent and that said Letters Patent is hereby corrected as shown below:

Column 1, line 11, after "referred" insert -to-.

Column 3, line 16, change "a air-cleaner" to -an air-cleaner-.

Column 3, line 57, change "is" to -are-.

Column 4, line 49, after "flowing" insert -through-.

Column 4, line 61, change "a" to -an-.

Column 5, line 38, before "muffler" insert -arranged in the-.

Column 8, line 5, change "passes" to -pass-.

Column 8, line 7, change "flows" to -flow-.

Column 8, line 44, after "referred" insert -to-.

Column 9, line 8, after "regardless" insert -of-.

Column 9, line 20, change "reminder" to -remainder-.

Column 11, line 64, delete "that" and insert -at which-.

Column 12, line 21, delete "as" at end of line.

Column 12, line 32, change "in to" to -into-.

UNITED STATES PATENT AND TRADEMARK OFFICE
CERTIFICATE OF CORRECTION

PATENT NO. : 5,782,087
DATED : July 21, 1998
INVENTOR(S) : Yukio Kinugasa, et al.

It is certified that error appears in the above-identified patent and that said Letters Patent is hereby corrected as shown below:

Column 13, line 2, after "flowing" insert --through--.

Column 13 line 56, after "regardless" insert --of--.

Column 14, line 12, before "adsorbed" insert --the--.

Column 14, line 49, after "step 49" delete "the".

Column 16, line 20, after "regardless" insert --of--.

Column 16, line 47, after "regardless" insert --of--.

Column 16, line 64, change "performs" to --perform--.

Column 16, line 65, change "performs" to --perform--.

Column 17, line 3, change "performs" to --perform--.

UNITED STATES PATENT AND TRADEMARK OFFICE
CERTIFICATE OF CORRECTION

PATENT NO. : 5,782,087
DATED : July 21, 1998
INVENTOR(S) : Yukio Kinugasa, et al.

It is certified that error appears in the above-identified patent and that said Letters Patent is hereby corrected as shown below:

Column 17, line 6, change "four-cylinders" to --four-cylinder--.

Column 17, line 10, change "ratio" to --ratios--.

Column 18, line 23, change "is lean, and;" to --is lean; and--.

Signed and Sealed this

Eleventh Day of April, 2000

Attest:

Attesting Officer

Q. TODD DICKINSON

Director of Patents and Trademarks